United States Patent [19]

David

[11] Patent Number: 4,971,751

[45] Date of Patent: Nov. 20, 1990

[54] SHOCK-ABSORBING SYSTEM FOR PULSED NUCLEAR POWER PLANT

[76] Inventor: Constant V. David, 4952 Field St., San Diego, Calif. 92110

[21] Appl. No.: 335,994

[22] Filed: Apr. 10, 1989

[51] Int. Cl.$^5$ .......................... G21C 13/04; G21J 3/00
[52] U.S. Cl. .................................. 376/273; 376/150; 376/276; 376/285
[58] Field of Search ............... 376/102, 125, 150, 152, 376/273, 276, 285; 248/560

[56] References Cited

U.S. PATENT DOCUMENTS

| | | | |
|---|---|---|---|
| 4,292,568 | 9/1981 | Wells et al. | 376/125 |
| 4,344,911 | 8/1982 | Maniscalco et al. | 376/102 |
| 4,569,819 | 2/1986 | David | 376/273 |
| 4,583,584 | 4/1986 | Wepfer | 376/285 |
| 4,596,689 | 6/1986 | Gorholt et al. | 376/285 |
| 4,752,436 | 6/1988 | Snyder | 376/285 |

OTHER PUBLICATIONS

"A Novel Fusion Power Concept Based on Molton Salt Technology: Pacer Revisited", Call et al., UCRL-98346, 5/88.
"Pacer Revisited", Moir, UCRL-98468, 11/88.
"Energy Absorption by Dynamic Crushing", David, The Shock and Vibration Bulletin, USNRL, 2/66.

Primary Examiner—Daniel D. Wasil

[57] ABSTRACT

Nuclear devices are detonated periodically inside an underground cavity in which a working fluid absorbs most of the thermal energy released by the device detonation. The kinetic energy contained in the shock wave created within the working fluid is absorbed by shock absorbers located outside the inner wall of the cavity. This wall consists of adjacent plate segments that separate and recoil outwardly as do pieces of shells of fragmentation grenades. The shock wave kinetic energy is transferred to the segments that are constrained in their outwardly-directed flight by shock absorbers. The shock-absorbing system is solidly attached to the rock structure surrounding the cavity. The loading transmitted to the rock is of a much lower intensity than that which the plate segments sense, though of a much longer duration. The momentum trapped in the shock wave is thus absorbed by the rocks but in a manner such that the rock structure is not affected. The survival of that rock structure insures that the cavity could be used a very large number of times, sequentially spaced. The cavity is sealed positively from the outside at all times by specially-designed bellows that surround individual shock absorber elements.

16 Claims, 2 Drawing Sheets

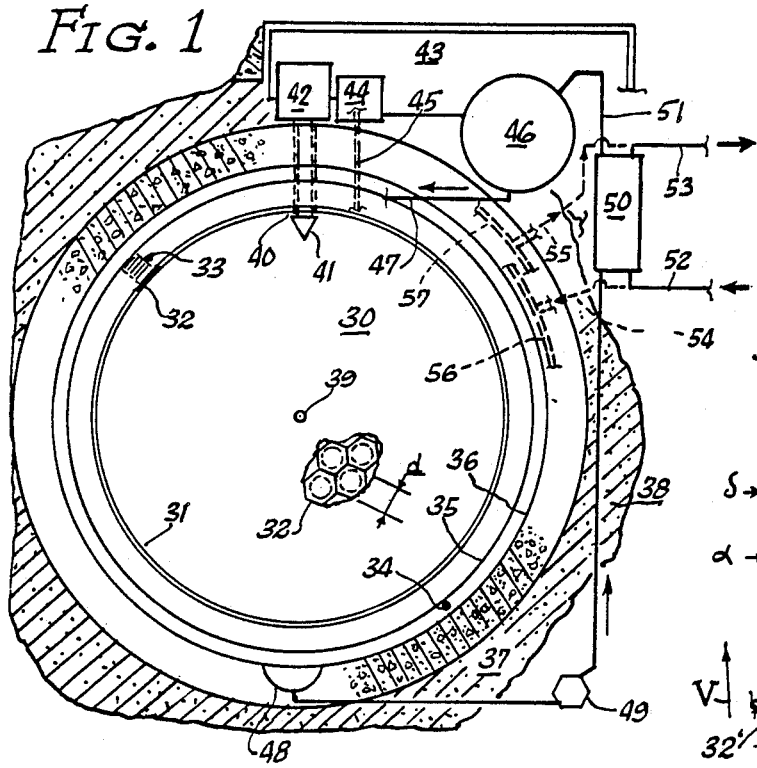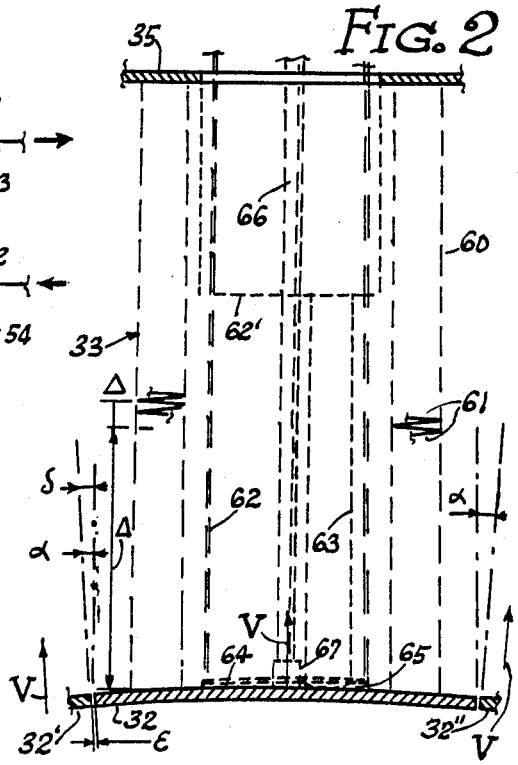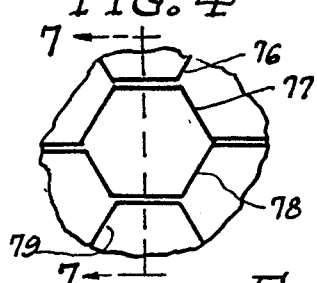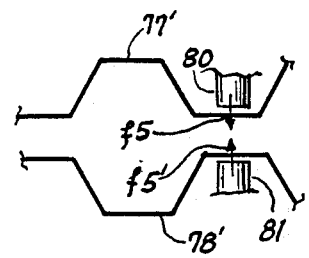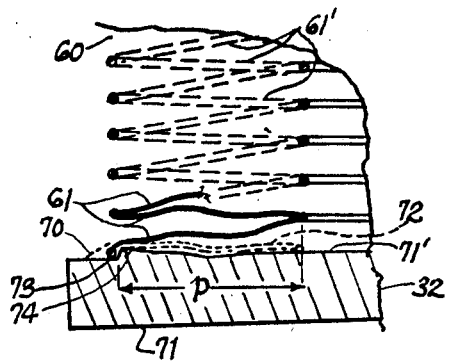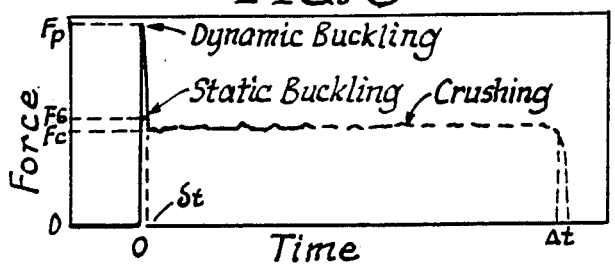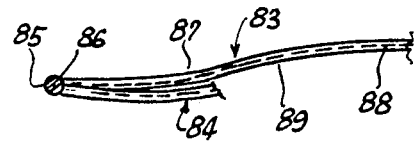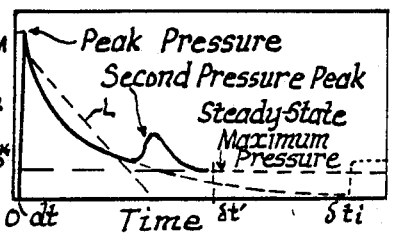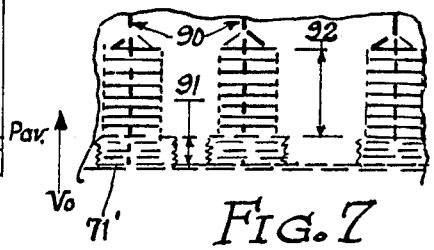

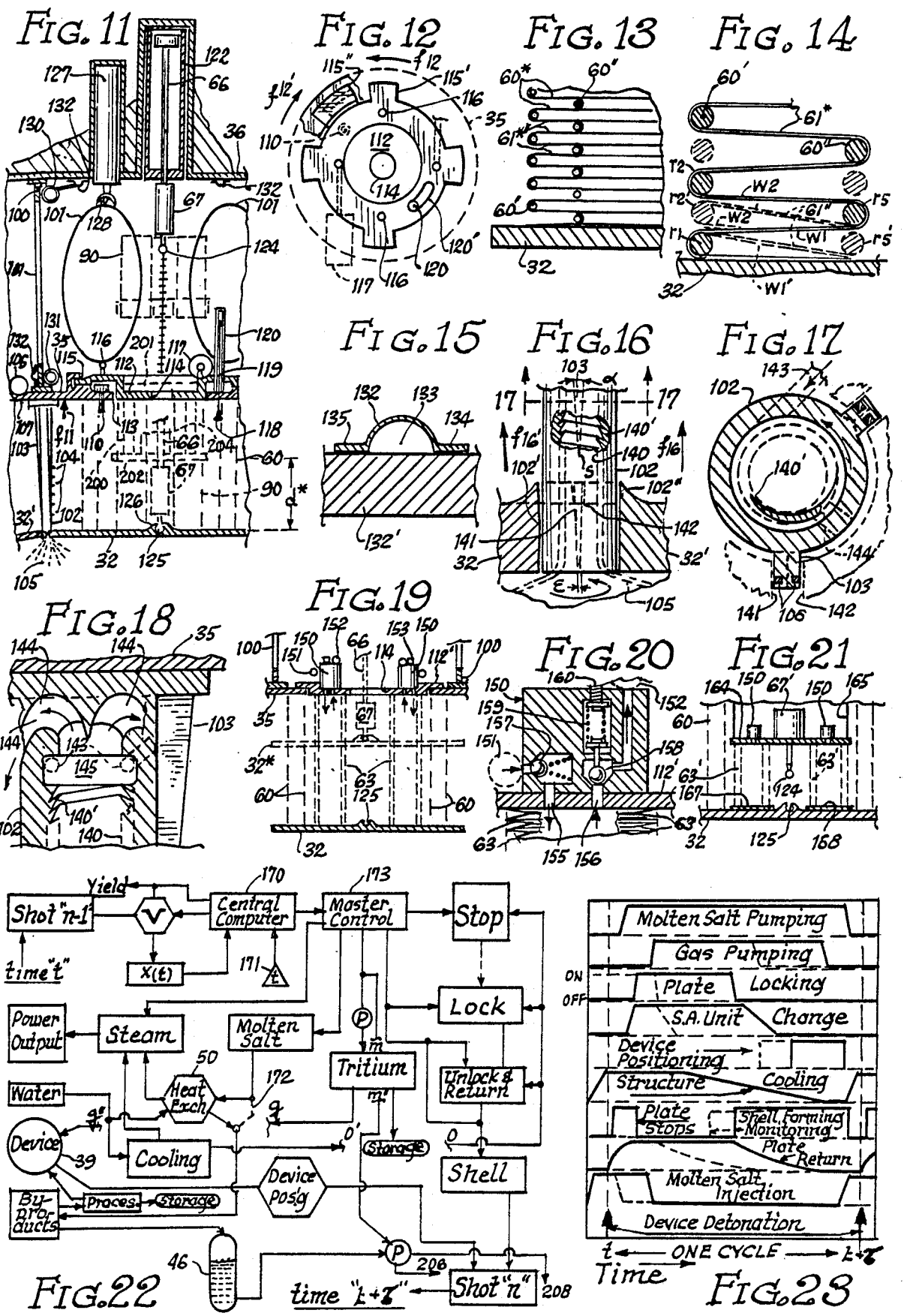

SHOCK-ABSORBING SYSTEM FOR PULSED NUCLEAR POWER PLANT

BACKGROUND OF THE INVENTION

The present invention relates to shock-absorbing systems for use in underground pulsed nuclear power plants in which the nuclear energy released by the explosions of nuclear devices is used for varied applications. These include the production of power, the generation of nuclear fissile materials or both. The general embodiment of such power plants is described and discussed in my U.S. Pat. No. 4,569,819 entitled PULSED NUCLEAR POWER PLANT (Ref. 1) and a paper submitted by Charles J. CALL and Ralph W. MOIR of the Lawrence Livermore National Laboratory to Nuclear Science and Engineering, dated May 27, 1988 (Ref. 2), entitled A Novel Fusion Power Concept Based on Molten Salt Technology: PACER Revisited.

One of the many technological problems related to such concepts is that of attenuation or dampening of the shock loading of whatever structures being used to contain the nuclear explosions. This problem is compounded by the fact that such containement must be provided many times over a lifetime period of the plant of thirty years or so. This, of course, is to happen without catastrophic failure. Ref. 1 and another paper published in Fusion Technology by Ralph W. MOIR (Ref. 3) entitled PACER Revisited of Nov. 18, 1988, address this very problem. Initially, Project PACER concept, as does Ref. 1, dealt with power plants in which the working fluid is water initially that is transformed into superheated steam by the energy release. This means that both peak operating pressures and temperatures are elevated to the point where survivability of structural elements operating in such environment is indeed questionable. In Ref. 3, the author attempts to shape the cavity wall and improve its anchoring to a surrounding rock structure in the hope that the rock structure will survive up to 200,000 explosions over a period of 30 years.

The inventor contention is that a more logical and promising approach is to isolate the surrounding rock structure from shocks that inevitably reach any wall that is directly exposed to the medium in which the detonation occurs. The inventor believes that the dampening of shock waves or containment of the fireball by thermo-hydrodynamic means is illusory. A decoupling of the effects of any interaction of the hot medium on such containment walls from the supporting and surrounding structure seems necessary. This is the role that the present invention embodiment assumes as applied to the pulsed nuclear power plant advanced in Ref. 1 and 2.

Such decoupling can be achieved by letting the impulse imparted by the shock wave interaction with a mobile rigid structure during a very short time be transferred to a static rigid structure holding the cavity over a much longer period of time. In the process of momentum transfer and kinetic energy conservation, the average loads exerted on the static structure are much lower than those which it would have to withstand were it not for the presence of the buffering action of a shock-absorbing system. Such buffering action of a shock-absorbing system can be accomplished by flexible and compressible structural elements located between the mobile and the static rigid structures.

In Ref. 1, the shock-absorbing system is located in and exposed to the medium before, during and after the detonation of the nuclear device. This renders access to the shock absorber system very unwieldy during the lifetime of the plant. In the concept advanced in Ref. 2, by comparison, the medium environment is even more hostile and practically impossible to deal with. However, in terms of medium peak pressures and temperatures, the static structure is exposed to much lower loads. This allows and justifies a repositioning of the shock-absorbing system, from inside the cavity to outside deformable and thus compliable walls of the cavity.

SUMMARY OF THE INVENTION

It is therefore a primary object of the present invention to provide a pulsed nuclear power plant in which mechanical decoupling of the nuclear device detonation shock effects from the structures forming the cavity is accomplished outside an inner surface of a deformable and compliable wall delineating the cavity.

It is another object of the present invention to provide shock absorbers located outside the confines of that inner surface.

It is another object of the present invention to provide flexible structural elements positioned between the mobile and static portions of the cavity wall.

It is another object of the present invention to provide a rigid but repeatedly fragmentable shell formed by the rigid mobile portions of the cavity wall when exposed to the shock effects of the nuclear device detonation.

It is another object of the present invention to provide sealing of the cavity interior from the shock-absorbing elements located behind the mobile rigid segments forming the shell.

It is another object of the present invention to provide servicing access to the shock-absorbing elements and cooling after nuclear device detonations.

It is another object of the present invention to provide guidance for the segments during their recoiling after detonation of the nuclear device.

It is another object of the present invention to keep the segments immobilized and secure at the end of the recoiling stroke.

It is another object of the present invention to provide mechanical means for returning the segments to their initial positions so as to prevent them from mechanical interferences.

It is still another object of the present invention to provide a shock-absorbing system that is expendable and can be replaced after operation and after each nuclear device detonation.

Accordingly, the present invention provides engineering solutions to problems raised in the operation of pulsed nuclear power plants such as shock isolation from the effects of the detonation of a nuclear device and confinement of by-products resulting from the detonation. This enables such power plants to make use of working fluids of complex natures such that they can be used to produce other nuclear fuels and additional useful radioactive materials.

DESCRIPTION OF THE DRAWINGS

FIG. 1 is a schematic sectional view of the underground cavity of a pulsed nuclear power plant showing the general arrangement of cavity walls and a cooperating shock-absorbing system.

FIG. 2 is a schematic sectional view of a shock-absorbing element showing proportions and positioning at the rest position.

FIG. 3 is a blown-up partial sectional view of the outer bellows configuration and its attachment to a plate segment.

FIG. 4 is a partial view of the end of a disposable shock-absorbing element showing an example of the hexagonal cell pattern of its crushable structure at the time of its installation.

FIG. 5 is a schematic drawing showing how the cell structure of the disposable shock-absorbing element may be constructed.

FIG. 6 is a partial cross-sectional view of a bellows in which the bellows flexible wall comprises several metallic foils.

FIG. 7 is a schematic diagram showing how the bottom part of a disposable crushable shock-absorbing element deforms during the slowing down period of the plate segment that it is arresting.

FIG. 8 is a graph showing the type and shape of the loadings that a disposable and crushable shock-absorbing element transmits to the fixed portion of the structure surrounding the cavity.

FIG. 9 is a planar view of the shock-absorbing system located behind a plate segment and in which compressible individual elements of shock absorbers are positioned inside the outer bellows.

FIG. 10 is an approximate graphical representation of the type of pressure loadings to which the plate segments are exposed.

FIG. 11 is a partial sectional view of the assembly of a typical shock-absorbing element shown with a corresponding portion of the cavity forming and supporting structure.

FIG. 12 is a top view of the shock absorber upper end structure (i.e. disposable system) showing how it can be constructed so as to enable its easy disengagement from the cavity wall.

FIG. 13 is a partial sectional view of an alternate type of bellows and of its attachment to an associated plate segment.

FIG. 14 is a blown-up sectional view of the bellows of FIG. 13 showing how the bellows wall deform at maximum compression.

FIG. 15 is a cross-sectional view of a cooling-fluid channel shown mounted on an associated portion of structure to be cooled.

FIG. 16 is an elevational cross-section of the end of a typical structural tube used for guiding the segment plates and injecting the working fluid in the cavity.

FIG. 17 is a sectional view along section line 17—17 of FIG. 16 showing how the working fluid is urged to create a vortex inside the injection tube as it is brought inside the cavity.

FIG. 18 is an elevational cross-section of the top end of the guiding and injection tube showing how the working fluid is channelled inside the tube and how the impacting blast products are vented out of the tube.

FIG. 19 is a schematic cross-sectional view of a shock-absorbing system in which the shock absorber elements consist of compressible bellows filled with an incompressible fluid that resists the compressive loads imposed by its associated plate segment.

FIG. 20 is a schematic section drawing of the automatic valving arrangement used to control the incompressible fluid pressure.

FIG. 21 is a schematic drawing of the first stage of a laterally rigid shock-absorbing element and of its attachment to an associated segment plate.

FIG. 22 is a schematic representation of a functional block diagram showing how the shock-absorbing system operates when associated with various other components of a pulsed nuclear plant in which the working fluid is a molten salt.

FIG. 23 is a chronological diagram of the various operations performed during a typical detonation cycle of the pulsed nuclear plant shown diagrammatically in FIG. 22.

DETAILED DESCRIPTION OF THE INVENTION

Referring to the drawing of FIG. 1, a generally sphericallyshaped cavity 30 of a pulsed nuclear power plant comprises an inner shell 31 formed by segments or juxtaposed plates 32 retained by shock-absorbing elements or shock absorbers 33 mounted on a cavity-supporting structural assembly 34 consisting of two concentric walls 35 and 36. The outer wall 36 is backed by reinforced concrete 37 that isolates this wall from a rock formation 38 surrounding cavity 30. A nuclear device 39 is introduced by means of delivery tube 40 protected by deflector 41. Device 39 is positioned by mechanisms housed in chamber 42 located in operation hall 43. Gaseous products are processed in chamber 44 and ducted out of cavity 30 by collecting tube 45. Molten salt used as working fluid is stored in tank 46 and channelled to a working fluid injection system (not shown here) by duct 47. Heated molten salt is collected at the bottom of cavity 30 in reservoir 48 from which it is pumped out by pump 49 into heat exchanger 50 from where it proceeds to tank 46 by means of tube 51. Water is introduced into heat exchanger 50 by duct 52 for heating and the steam produced is ducted by tube 53 for driving turbo-generator (not shown) for the production of electricity, for instance. A second water/steam loop shown in dotted lines is represented by tubes 54 and 55 connected respectively to manifolds 56 and 57. These manifolds are connected to a coolant network (not shown here) used to cool various components of structural assembly 34. Construction details not shown here are described later in this section. Segment plates 32 are quasi-hexagonally shaped so as to conform to the substantially spherical shape of cavity 30 envelope.

Shock absorber assembly 33 of FIG. 1 is shown in more details in FIG. 2 where bellows 60 connect plate 32 to cavity inner structure 35 by means of a plurality of convolutions 61 stacked up between plate 32 and structure 35. The first and last convolutions of bellows 60 are joined to plate 32 and structure 35 respectively so as to seal the volume inside the bellows from the outside environment. Segment plates 32 are either flat or spherically curved but abutting against adjacent plates such as 32' and 32''. In either case, all plates 32 separate when a velocity V is imparted to them by the shock impact that follows each device detonation. The directions along which two adjacent plates radially and outwardly move form an angle α. The separation distance between plate contiguous sides grows from a minimum clearance ε to a value δ, as the plates travel outwardly. Values of α are discussed later in the following section. The plates or shell segments travel a nominal distance Δ for a nominal yield of the nuclear device. Values of distances Δ can be typically several feet for plate dimensions d of 6 ft (FIG. 1). The distance separating plates 32 from inner structure 35 at rest, i.e. when the plates are adjacent, varies according to the type of shock absorbers used. For rigid telescoping piston/cylinder arrangements as described in Ref. 1, that distance is typically about 3 Δ. For crushable and disposable shock absorbers, that that distance could be about 2 Δ. WIth shock absorbers units that contain an incompressible liquid which can be pumped in and forced out, the separation distance could be as low as 1.6 Δ. As an example, the schematized rigid shock system 62 is shown as being much longer than the length of flexible shock absorber units 63. In the following description of three basic shock-absorbing systems, that difference in length is neither shown nor mentioned again. It is emphasized here for the first and last time.

With incompressible fluid shock absorbers, inner structure 35 will occupy position 62' relative to plate 32, at rest. In either case though, the bottom ends of the shock absorber units make contact with plate 32 by means of end plates 64 (rigid shock absorbers) or 65 (incompressible fluid shock absorbers). End plates 64 or 65 are not mounted on segment plate 32 but simply push against it, as is discussed in the next section. Thus plates 32 need lateral guidance when they are not at their rest position, as described later on. Plates 32 must also be constrained in the variable stop positions at which their shock-absorbing systems arrest them at the end of their outwardly-directed travels. To that effect, a locking and retaining mechanism schematized by stem 66 and selflocking device 67 is provided, as described and discussed at length in Ref. 1, and briefly hereinunder (FIGS. 11, 19 and 21). But, at no time, are self-locking device 67 and end plates 64 (or 65) connected to and/or interfering with one another.

FIG. 3 drawing exemplifies the care with which bellows or any other rigid structural elements must be connected to plates 32 so as to avoid extreme stresses at the junction point when plates 32 are suddenly accelerated outwardly by the shock impact on face 71 of plates 32. Such extreme stresses can be prevented from developing when neither large nor concentrated deformations of mechanical parts adjoining upper face 71' of plates 32 are generated. To such effect, flexible walls 61 of bellows 60 must be dimensioned and shaped so as to fold against one another and against the portion of face 71' of plates 32 without causing appreciable bending of any part of walls 61 which are acting as membranes, sort like. The first wall of the first convolution of bellows 60 must be able to come to rest against a circular and specially-profiled portion p of plate 32 so that it can assume the position and shape indicated as 72. Brazing fillet 70, as shown, and brazing (not shown) on the other side of the first wall 61 of the bellows and located between circular bead 73 and ridge 74 of plate 32, insure that the amount of local bending of the bellows membrane wall needed to assume position 72 is minimized. As plate 32 moves upward, wall membranes of the bellows keep collapsing and folding until the compression wave thus created propagates forward ahead of the slowed down plate. It should be emphasized at this juncture that the compression of the bellows plays a negligible role in slowing down the plate. This is chiefly accomplished by the shock absorbers.

FIG. 4 drawing shows a hexagonal cell of such shock absorbers in which the plate kinetic energy is dissipated by crushing such cells in a direction perpendicular to the plane of FIG. 4. A description of such honeycomb structures and their crushing characteristics are presented in Ref. 4 entitled ENERGY ABSORPTION BY DYNAMIC CRUSHING by C. V. David published in THE SHOCK AND VIBRATION BULLETIN of February 1966 (Bulletin 35, Part 5) of THE SHOCK AND VIBRATION INFORMATION CENTER, U.S. Naval Research Laboratory, Washington, D.C.. This type of honeycomb structure can be fabricated in any length and diameter that one wishes and out of aluminum or steel sheets. The sketch of FIG. 5 indicates how sheets 77' and 78' can be spot-welded by means of two opposing electrical contacts 80 and 81 being pressed together, as shown by arrows f5 and f5'. Flat metal sheets are first bent to assume the corrugated forms depicted in FIG. 5.

The sketch of FIG. 6 shows an enlarged section of the end of any convolutions of bellows 60 where two walls 83 and 84 (or membranes) are joined together by weld bead 85. Walls 83 and 84 consist of a plurality of foils, e.g. 87, 88 and 89, in the present case, so as to provide the flexibility desired of the membranes. A dry lubricating material such as powdered graphite may be used between the foils to prevent adherence and local friction points.

FIG. 7 sketch shows how the cell depicted in FIG. 4 would deform under dynamic crushing conditions, as described and discussed in Ref. 4. This partial sectional view corresponds to a section made along section line 7—7 in FIG. 4, in other words lengthwise. The cell bottom ends located at rest against flat face 71' of a plate 32 are not deformed, except as discussed later in the next section, and appears as do portions 90 of the cell wall. However, when a plate 32 suddenly acquires a velocity V (FIG. 2), the side walls of the cells do not have enough time to buckle according to their normal collapsing pattern which is followed whenever wall material is given time to displace laterally, e.g. as in the case where axial loadings are applied slowly. Portions 91 at the bottom end of the cells is smashed whereas, when plate 32 velocity has dropped to a smaller velocity Vo, the cell walls fold and crumple in a regular pattern (portions 92 of the walls).

The forces required to smash and then crumple the cell walls are shown graphically by FIG. -8 curves. These forces are transmitted to the structure against which the top end surface of the honeycomb assembly, restrained in final analysis by inner structure 35, reacts. The totality of the shock absorbers react the same way. Thus, structures 35 and 36 forming cavity 30 become statically loaded at a multiplicity of equidistant locations, as a spherical tank shell wall would be by an internal pressure. This loading lasts for a time δt that is long with respect to Δt, duration of the smashing action, much longer with respect to the duration of the shock loading of plates 32, though very much shorter with respect to whatever time elapses between any device detonation and the subsequent one. The operation of a crushable and disposable shock absorber of this type is discussed in the next section.

The drawing of FIG. 9 shows how protective bellows 60 and individual shock absorber units 63 are distributed on face 71' of any plate 32. The contour of plate 32 is a quasi-regular hexagone. It differs from a perfect regular hexagon in that its sides are not quite straight, but slightly curved as indicated by an arc 94 for example. This means that the apex angles β of the plates are slightly less than 120 degrees to accommodate the sphericity that all plates must assume for forming shell 31 of FIG. 1. Moreover, corners such as 95 must be trimmed as shown by arcs 96 so as to provide for the presence of tubes needed for the delivery of working fluid and lateral guidance of plates 32.

In FIG. 10, the interaction of the working fluid, that has been heated and accelerated outwardly by some of the energy released by the preceding detonation, with the plates is shown as pressures sensed by faces 71 of plates 32. The significance and importance of the various curves, of their peaks and associated times of occurence are elaborated on in the following section. They represent only an approximation of interaction effects that could materialize in the worst, though most probable, case of operation.

FIG. -11 drawing shows features and embodiments of various components and/or systems that are required by and for the shock-absorbing system repeat-operation performance. Such requirements, for instance, are: (1) restraining and guiding plate 32 before, during and after each stroke (recoil or travel); (2) holding plate 32 at the end of its stroke; (3) returning plate 32 to its initial position before the next detonation; (4) insuring that all plates are returned synchronously and simultaneously; (5) providing the space and means for changing shock absorber units if they are of a disposable nature (crushable type); (6) enabling such units to be installed in place and then removed after use; (7) transmitting the compression loads imposed on the shock absorber element by plate 32 to inner structure 35 and then to structure 36; and (8) providing ways to maintain each and every plate in the position that it is supposed to occupy when it ceases to be part of the fragmentable shell of which each plate forms a segment. Moreover, additional functions require to be performed concurrently with those of the shock-absorbing system, i.e. (1) injecting working fluid in cavity 30; (2) monitoring radial displacements of the plate; (3) inserting and positioning the nuclear device; (4) evacuating the gaseous by-products and pumping out the hot molten salt; (5) controlling the power plant and coordinating the simultaneous performances of all these functions; and (6) cooling all fixed members of cavity 30 structures 35 and 36, and structural connections thereof.

Bellows 60 must be flexible and have a lifetime at least equal to that of the power plant, hopefully even longer. In their compressed state, they must withstand an appreciable external pressure unless provisions are made to pressurize the space contained between the two walls formed by concentric structures 35 and 36. Cracks in the bellows walls cannot be allowed to develop during that lifetime. Three advantages offered by the present invention embodiments are worth mentioning at this juncture, for they necessarily strongly affect the configuration adopted for the incorporation of shock absorbers in the pulsed nuclear power plant proposed in Ref. 2 and 3. Such a configuration is summarily embodied in the partial sectional view of FIG. 11 drawing. These three important advantages are: (1) the possibility of directly cooling the structure exposed to the hostile environment prevailing in cavity 30; (2) the creation of a more rigid structural shell around cavity 30; and (3) as a consequence of the first two advantages, the possibility of using a less expensive and more readily available structural steel type for the construction of the cavity shell.

Thus, a typical shock-absorbing system incorporation into the simplified conceptual sketch shown in Ref. 2 and 3, i.e. one single wall steel shell attached to concrete and the surrounding rock formation, is particularly eased by the use of a dual-wall shell consisting of quasi-spherical inner structure 35, outer structure 36 and a plurality of intermediate reinforcing webs such as 100. Each web includes one large central hole 101 used for passages of ducts and pipes as needed. These holes also allow access to each shock absorber and enable the removal and installation of disposable/crushable shock absorber elements such as 90. Webs 100 form a honeycomb-like structure of which each hexagonal cell corresponds to one shock absorber assembly location and size. The cut corners of three contiguous plates 32 cooperate for providing the positioning of working fluid injection tubes 102 mounted on inner structure 35 and reinforced by three longitudinal fins 103. Each fin 103 is equipped with sensors 104 for detecting the passing of the plates during their recoiling path. Also, fins 103 cooperate with plates 32 to insure their lateral guidance during such recoiling. Shortly before detonation of nuclear device 39, conical sprays 105 of working fluid are formed by shaped ducts inside tubes 102, not shown here, to which working fluid manifolds 106 supply fluid by means of pipes 107 (details not shown).

Alternatively, plates 32 travel can be detected by proximity sensors 110 mounted on structure 35 and inside bellows 60. For illustrative purpose, a crushable/disposable shock absorbing system is presented in FIG. 11. Thus, provisions are made herein for installing new shock absorber units before each detonation and for removing crushed units, i.e. to be disposed of, after each detonation. To that effect, cover plates 112 close and open circular windows 113 cut in structure 35. Each cover plate includes a central hole 114 and clamping devices 115 described later on. In addition, a plurality of holding balls 116 provide means for lifting cover plates 112. A pair of linear actuators 117 facilitates the rotation of the cover plates, for either locking or disengaging clamping devices 115, as described hereunder (FIG. 12). Stops 118 mounted at the ends of rods 119 powered by actuators 120 serve to hold a plate 32 when the latter is being pushed outwardly by the internal pressure then existing in cavity 30 while the shock absorber units are being replaced.

Plates 32 are also being retained then by self-locking clamping system 67 attached to power rod 66. The latter is positioned by linear actuator 122. The construction and operation of selflocking clamping systems 67 are extensively described and discussed in Ref. 1 and need not be repeated here. Spherical heads 124 cooperate with matching centered cavities 125 provided at the center of each plate 32 and housed in a boss 126. This self-locking clamping system is used for returning plates 32 after a new shock absorber unit has been installed underneath cover plate 112 and after the internal pressure existing in cavity 30 has decreased below a level compatible with the initiation of the plate return.

The outer cylindrical walls of actuators 120 are mounted on inner structure 35 and are fixed. The end of the power shaft of linear actuator 127 is equipped with a plurality of claws 128 for seizing holding ball 116 when lowered so that cover plate 112 can subsequently be lifted. The upper flat face of shock absorber unit 90 is caused to adhere to the inner face of cover plate 112 with resin-bonding for instance, as is well known in the art, and that becomes easily loosened after a detonation has occurred. It should be remembered that shock absorber units 90 only make contact with associated plates 32 but that they are never caused to adhere to them. The mechanical systems used for handling and moving shock absorber units 90, and cover plates 112 relatively to one another are not shown here. Also construction provisions for moving shock absorber units in and out of the spaces located between structures 35 and 36 are not shown here either. To that effect, openings in structure 36 are provided elsewhere at locations where accommodations can be made, as discussed later in the next section.

The cooling of cavity 30 structures (35, 36 and 100) is provided by water brought by pipe 54 and distributed by manifold 56 as shown in FIG. 1. This water is locally distributed by a plurality of duct 130 and 131 to a network of cooling channels 132 affixed to inner structure 35, outer structure 36 and intermediate webs 100. The hot water and steam generated are collected by manifold 57 and evacuated by pipe 55, as shown in FIG. 1. At a plurality of locations such as that indicated by arrow f11, ducts (not shown) are fitted so as to evacuate the gaseous by-products created by and/or after the detonation of the nuclear device. Evacuation by pumping of the hot molten salt at the bottom of cavity 30 as indicated in FIG. 1 is accomplished in a similar manner. In that instance, the illustrative representation of the shock-absorbing system would be upside down from that depicted in FIG. 11.

The drawings shown in FIGS. 12 to 18 correspond to details or design variations of some invention features already described in a general way. FIG. 12 corresponds to a top view of cover plate 112 and indicates how the cover plates can become locked and can be disengaged from a locked position. To that effect, a plurality of tabs 115' can move a fraction of a revolution when caused to rotate in the direction of arrow f12. At such time, they become engaged under one of a plurality of cooperating retaining structures such as 115". Two actuators 117 (only one shown) power the rotation of the cover plate. The same actuators can also cause cover plate 112 to rotate in the reverse direction (arrow f12'), when so directed, thus unlocking the cover plate by disengaging tabs 115' from under retainers 115". Elongated openings 120' cut in the cover plate flange provide passages for actuators 120 of stops 118 and accommodate the partial rotation of cover plate 112. Two of a plurality of holding balls 116 and of proximity sensors are also shown for indicating that those features are regularly interspersed along the circular location available on and below the cover plate upper flange.

The drawings of FIGS. 13 and 14 pertain to partial sectional views of an alternate type of bellows 60* in which flexible walls 61* forming the bellows assembly are continuous. Such wall is also made of a plurality of metal foils bent together to form convolutions 61*. However, for reasons made clear earlier, provisions must be made for preventing the radii of curvature at the bottoms and tops of the convolutions to vary appreciably to avoid undue stressing of the convolutions bends. To that effect, rigid rings such as 60' and 60" are positioned as shown in FIGS. 13 and 14. When plate 32 is suddenly accelerated upwardly, those rings can only stack up in two concentric cylinders consisting of adjacent rings in contact with one another by means of two walls 61" that are forced to become into temporary contact. This is self-evident from the new positions r2 and r5 that rings, in rest positions, r2 and r5 must assume when total compression is forced on the bellows. In such case, walls w1 at rest position then occupies compressed position w1' and wall w2 at rest position comes down to occupy compressed position w2'. As discussed in the next section, it is obvious that such type of bellows cannot offer the degree of compression of which bellows 60 are capable.

A typical cross-section of a cooling channel 132 is presented in FIG. 15. The semi-circular area 133 of the cooling-fluid flow is contained between the channel wall and a structure portion 132' intended to be cooled. Longitudinally-positioned flanges 134 and 135 on each side of the channel wall are affixed to structure portion 132' by brazing or sealing weld seams, for instance.

The drawings of FIGS. 16 to 18 show various sections of an injection tube 102 in which working fluid is urged to spin before it leaves the helically-grooved bore 140. The partial section shown in FIG. 16 corresponds to a section taken along section line 16-16 of FIG. 9. Three contiguous plates 32, 32' and 32" (not shown) cooperate to form a conformable quasi-bore 102' through which tube 102 can slide when plates 32 and 32' move up along arrows f16 and f16' directions. Clearance $\epsilon$ increases in the process as described for FIG. -2 drawing. Arrows f16 and f16' are not parallel and increases as the plates travel upward. At locations such as S, fins 103 appear, showing an apex angle $\alpha$. Because fins 103 serve to guide plates 32, 32' and 32", the cooperating faces 141 and 142 of clearance $\epsilon$ must be slanted, thus forming an angle $\alpha$. At locations higher up, sensors 104 can then be positioned within fin 103 variable thicknesses for detecting the passage of plates 32 (FIG. 17). Actually, the surfaces of bore 102' are shaped so as to form wedges in cooperation with the external cylindrical surface of tube 102, until distances $\delta$ (FIG. 2) become large enough to accommodate the presence of fins 103.

The internal helical grooves 140' of bore 140 are shaped so as to form guiding channels for the spinning working fluid, as shown in FIGS. 16 and 18. A cross-section through section line 17—17 of FIG. 16 indicates the shape of a ridge formed by helically-shaped grooves 140'. Working fluid is admitted by means of tangentially-oriented ducts 143 to give the fluid an initial whirl as it enters the grooves. At the bottom end of tubes 102, bores 140 flare out as shown so as to maximize the cone angle of sprays 105. Soon after a detonation, a mixture of salt vapor, molten salt and plasma debris from the nuclear device enter tubes 102. The mixture is diverted with a minimum of impact on structure 35 by deflectors 144 as shown in FIG. 18. Circular groove 145 collects the whirling working fluid before imparting the spin maintained by grooves 140'

The drawings of FIGS. 19 and 20 pertain to an alternate type of shock-absorbing system in which plate 32 kinetic energy is absorbed by the resistance offered by a fluid contained in a plurality of elongated flexible tubes. The walls of the tubes consist of bellows of either one of the types described earlier. Such tubes are schematically represented as 63 in FIGS. 2 and 9. In FIG. 19, they are also called out as 63, but are shown by a dual phantom line instead of a single phantom line, as previously done.

Each container bellows 63 rests at one end against plate 32, at the plate rest position. The other ends of bellows 63 are mounted on cover plate 112' from which some of the features of cover plate 112 are absent because cover plates 112' need not be removed as do cover plates 112. An automatic valving system presented in FIG. 20 is mounted on cover plate 112' for servicing each container. Fluid is admitted to the valving system by duct 151 and escapes through duct 152. A pressure regulator 153 sets the level of the peak pressure that can exist inside the bellows container. Self-locking device 67 with its rod 66 is also shown and operates in the manner and for the purpose previously described. Plate 32* shown in dotted line indicates the position of maximum travels of plates 32 for which container 63 volumes are at their minima.

The automatic valving device 150 depicted in FIG. 20 shows the top of a bellows 63 and two orifices 155 and 156 through which the fluid inside bellows 63 is allowed to flow in (155) and flow out (156), as indicated by the four arrows. The flow is controlled by two check valves 157 and 158. Check valve 157 is a simple non-return valve. Check valve 158 plays the role of a pressurizing valve and is set by means of spring 159 that is compressed by regulator 153 (not shown) which drives ajustment screw 160. The tanks used for storing the fluid and the associated pumps are not shown here, being well known in the art, but are located between structures 35 and 36. The fluid can be steam or water, as discussed in the next section in more details.

The drawing of FIG. 21 only shows the bottom part of a rigid cylindrical shock-absorbing system of the type described extensively in Ref. 1. Its description and mode of operation are elaborated on at length in that reference and thus are omitted here. However, the mode of attachment of the flexible lower portion of the rigid and piston-like shock absorber assembly has been modified. It is done to render the use of piston-like shock absorbers more compatible with that of bellows 60 which already provides sealing from the contents of cavity 30 and can isolate the shock absorber sliding walls from them. The bottom of cylindrical wall 165 of the piston is attached to base plate 164. A shortened version of the shock-absorbing system described for FIG. 19 (bellows 63 and valving systems 150) is used to decouple piston 165 from plate 32 so that long piston 165 is not subjected to the high acceleration levels that plates 32 sense when they are accelerated outwardly. In such case, bellows 63' are attached to bottom plates 167 and 168 or one single annular plate 167/168. The bottom plates only rest on plate 32 so that, if need be at a later time, the whole shockabsorbing system can be removed while plates 32 and corresponding bellows 60 remain in place, isolating and sealing cavity 30.

Self-locking system 67', identical to 67 but mounted on base plate 164, is used to lock plate 32 to base plate 164 at the position where their separation distance is at its minimum. The locking of the whole assembly of plate 32, base plate 164, compressed bellows 63' and piston 165 is referred to as clamping. The process is automatic and the friction-based brakes are slowly released so as to return the assembly to its initial position in a controlled manner. This action is described and discussed in detail in Ref. 1. This explains why self-locking device 67' is shown mounted at the bottom of piston 165. It should be mentioned here that the rigidity of a piston/cylinder-like shock absorber should not be deemed high enough to support plates 32 that are close to a vertical position during plate 32 returns. Thus, injection tubes 102 should still be present for use as radial guides and lateral supports.

Steam is used for compression fluid in Ref. 1 as is described therein. In such instance, storage tanks nd pumps are not needed in the embodiment construction of FIG. 21. As is the case for crushable/disposable shock absorbers and bellows-63 types of compressible embodiments, nothing but bellows 60 is permanently affixed to plates 32. As shown in FIG. 2, the flat bottom ends of bellows 63 can consist of end plates 65 that just rest against plates 32. Finally, it should be mentioned here that the space needed between structures 35, 36 and webs 100, in the case of a disposable shock absorber for facilitating the handling thereof can be reduced appreciably. Thus, at all times, as long as bellows 60 do not develop cracks, the sealing off of cavity 30 remains total. And vice versa, steam or air is not allowed to penetrate inside cavity 30, if the same types of precautions are taken regarding the introduction of the nuclear device inside cavity 30. Such perfect sealing was neither mandatory nor provided in the applications of a pulsed nuclear power plant as disclosed in Ref. 1.

The functional block diagram presented in FIG. 22 summarizes the description and operation of the shock-absorbing system when integrated in the operation of a pulsed nuclear power plant using a molten salt as described in Refs. 2 and 3. The word 'Shot' refers to any detonation and "n−1" to the number of such Shots that have taken place just after Shot "n−1" which imparts a velocity V to plates 32. The plate displacements X(t) sensed by sensors 104 are processed by computer 170 equipped with a time clock 171 so that values of V can be calculated, including its initial value. The yield of the device can then be estimated, as long as the total amount of liquid molten salt injected at time t is known. The duration of each cycle is $\tau$. The continuity of broken flow lines is indicated by corresponding set of letters such as m-m', o-o' or q-q'. Dotted line 172 refers to a bypass line of hot molten salt that may be sent for extraction of soluble by-products and do not go through the heat exchanger (Heat Exch. or 50). "Pos'g" stands for positioning and "Cooling" refers to cooling of the structures and possibly of some parts of the shock absorbers while plates 32 are stopped and locked, and then returned during a cycle. A master control unit 173 integrates and coordinates the various operations of all other key systems. The sequencing of these various operations is described graphically in the diagrams of FIG. 23. The BLOCKS shown in FIG. 22 correspond to a component, system and/or the functions that are performed thereby. The correspondence between the information contained in FIG. -22 diagram and FIG. -23 graphs is thus easy to establish.

The graphs of FIG. 23 indicate the relative timings and durations of the different functions or operations performed by the various systems and components shown in FIG. 22 during a typical cycle of duration $\tau$. The importance and relevance of this information are discussed in the following section. S.A. is an abbreviation standing for shock absorber. Whenever a dotted-line curve is shown in conjunction with a solid-line curve, it serves to indicate that the time elapsed between these two curves represents the amount by which the duration of certain operations can be varied or adjusted. In general, in seven of the graphs where dotted-line and solid-line curves are present, dotted-line curves and and solid-line curves correspond. On the time scale shown in FIG. 23 graphs, the device detonation and the shock-wave travel durations are for all intent and purposes assumed to be instantaneous.

Although the diagrams and graphs of FIGS. 22 and 23 pertain to the most complex case of a pulsed nuclear power plant having fuel breeding capability, because of the use of molten salt as working fluid, both diagrams and corresponding graphs can easily be simplified to cover the case of steam usage, as described in Ref. 1. Thus, it is believed that the reader will be able to easily make such simplification. Therefore, this is not done here.

DISCUSSION AND OPERATION OF THE INVENTION

Respective merits and demerits of pulsed nuclear power plants are sufficiently expounded in Refs. 1, 2 and 3, that this needs not be repeated here. It appears at first glance that molten-salt concepts have greater potential than steam concepts, in which for both cases a working fluid is used to absorb and store the energy liberated by means of fission/fusion nuclear reactions. This energy is produced quasi instantaneously on a large scale, must be stored for an almost infinitely longer time and then extracted during a roughly equivalent period of time. The side effects of the nuclear reactions must be minimized so as to make them amenable to handling by means of mechanical systems.

The first effect is the shock loading to which any structure used to contain these reactions must be able to withstand, not only once, but maybe hundreds of thousands of times. The second effect is the production of radioactive products that must remain contained or be safely extracted from inside the cavity. A third effect is resulting high temperatures and pressures that last during a major part of the lifetime of the power plant. The shockabsorbing system of the present invention aims at minimizing the magnitude of the first effect. This system also isolates the environment created in the cavity from the surrounding environment by means of sealing walls, though deformable, so that the end results of the second effect can be ignored and even exploited. The influence of the third effect can be rendered mechanically manageable by cooling the structures exposed to high temperatures and pressures so as to enable them to survive many cycles of exposure and to avoid the generation of excessive stresses and heating in the surrounding rock formation.

The extent to which these effects affect the mechanical structures and their survivability, varies between the two basic concepts mentioned above and is differentiable by the nature of the working fluid. Another differentiation stems from the nature of the nuclear device that is most versatile and thus most easily adaptable to the mode of extraction of the energy it liberates. In the molten salt concept, temperatures are higher and peak pressures are lower than those encountered in the steam concept. The creation of radioactive byproducts may be desirable in the former and be a problem for the latter of these two concepts. A nuclear device using a fission trigger may be useful in the former but quite a nuisance in the latter. The intensity of radioactivity of the working fluid reaches a constant level at which it can maintained in the former concept while it increases with time in the case of the latter concept, unless the water is processed after condensation for radioactive byproduct elimination and treatment. All this is summarized in Table A below for a quick evaluation of these respective merits and demerits, and a readily available indication of the types of solutions that are needed to solve attendant problems. Similar nuclear device yields and plant power capacities are assumed for both concepts.

TABLE A

Merit Comparison Between Molten-Salt And Water Concepts

| PARAMETER | CONCEPT | | SOLUTIONS |
| --- | --- | --- | --- |
| | Water | Molten Salt | |
| Peak Pressures | 2000–3000 psi | 400–500 psi | Pressure Vessels |
| Temperatures | 450–550° C. | 1000–1300° C. | Cooling for M.S. |
| Radioactivity | Too high | Exploitable | Use of By-products |
| Energy Usage | Heat Source | Multi Uses | Breeding for M.S. |
| Mater'l Comp. | State-of-the-Art | Problematic | Uncertain for M.S. |
| Cavity Sizes | Largest | Smallest | To be Minimized |
| W.F. State* | Steam | Liquid | Cool'g of Fireball |
| W.F. State** | Super Heated Steam | Hot Liquid | Heat Exch. for M.S. |
| Rock Resist. | Acceptable | Questionable | Heat Barriers |

LEGEND:
*at time of detonation
**shortly after detonation
psi - pounds per square inch
Mater'l - Structural material
Comp. - compatility with W.F.
W.F. - Working Fluid
M.S. - Molten Salt
Cool'g - Cooling
°C. - degrees centigrades
Heat Exch. - Heat Exchanger
Rock Resist. - Rock Bed Resistance at elevated temperatures The parameter characteristics presented in TABLE A above in a qualitative more than a quantitative manner are derived from Refs. 1, 2 and 3. Though rather qualitative in nature, a review of these parameter values and/or operating range estimates leads to a set 1. Both concepts require a substantial pressure vessel;
2. rock strength could contribute more to pressure resistance in the case of the water concept than it could for the molten salt concept, because of the operating temperature levels;
3. at the very least, heat insulation of the rock from and/or cooling of the cavity wall structure are mandatory in the case of the molten salt concept;
4. the amount of shock dampening provided by the presence of droplets of molten salt on the path of the fireball expansion will remain uncertain, this cannot yet be seen as a sure solution;
5. the versatility of the molten salt concept makes it attractive;
6. the high accumulation of radioactive byproducts in condensed water, especially of tritium in highly diluted form in water, would be unavoidable and too costly to handle;
7. tritium remains in gaseous form in the molten salt concept, (not soluble in molten salt), thus is easily extractable; and
8. the handling of molten salt, namely a mixture of lithium fluoride, beryllium fluoride and possibly of thorium/uranium fluooride in some cases, is quite a difficult engineering task.

The technical data on the nuclear and chemical reactions taking place in the cavity is given in Ref. 2. In Ref. 3, the author indicates how a dimpled steel shell anchored in the backing-up concrete and rock formation might be able to withstand the combination of shock loading and temperatures to which they are exposed. It is very unlikely that such an arrangement could survive more than a few detonations, much less have a lifetime of 30 years.

Still it would appear that the molten salt concept holds better promises and greater possibilities than those of the water/ steam concept, because of its nuclear fuel breeding capabilities. However, lower peak pressures in the cavity cannot compensate for the much higher operating temperatures in terms of permanent containment of the molten salt without the help of both external cooling and almost certainly shock of dampening. It is the inventor's belief that cavity structural constructions that offer the capabilities of reducing shock loads and structure operating temperatures will make the molten salt concept viable and most attractive. The cost will be much higher than that of the much simpler contruction described in Ref. 3, but the enhanced likelihood of cavity survival more than offsets the increased construction costs.

Therefore, the invention embodiments presented herein combine the four essential features that can render the molten salt concept viable and much more promising. They are: (1) shock attenuation between the cavity shell and the surrounding rocks; (2) structure cooling external to the cavity; (3) fragmentation of the shell into separable segments or plates; and (4) sealing of the cavity by means of a continuous but deformable wall that preserves its integrity when the shell fragments. Such features are also possible and advantageous for Ref. 1 configuration, though less mandatory. But the molten salt concept is chosen herein as model for a pulsed nuclear power plant in which the adoption of external shockabsorbing systems seem to prove most advantageous.

Cavity Environment Definition:

From the data shown in TABLE A, it seems that temperature is the most critical parameter. It will vary between 400° C. prior to detonation and anything between 800°-1200° C. after detonation depending on the amount of molten salt injected per shot. Plates 32 of FIGS. 1, 2, 3 and 11 are exposed directly to this thermal environment and so are bellows 60, but to a lesser degree. Portions of the inner surface of structure 35 are equally exposed, but all of its outer surface is available for direct contact with coolant (FIGS. 11 and 15). Plates 32 are subjected to local stresses but not to hoop stresses. Their back surfaces could possibly be cooled by water jets impacting on them. The same applies to the inner surfaces of bellows 60. Average temperatures for these components could be in the range of 650°-700° C., safe for suitable steels. Depending on the effectiveness of water-jet cooling, the peak temperatures inside the cavity could reach 1000° C. to possibly 1100° C. just after detonation. It might have been as low as 400° C. just before that.

At detonation time, the pressure in the cavity is equal to atmospheric. A short time after detonation it may reach 400-500 psi according to Refs. 2 and 3 and last long. The resulting hoop load must be resisted by the combination of structures 35 and 36 that form a quasi-honeycomb structure 34 in combination with webs 100 (FIG. 11). Some of this load is transmitted directly to the surrounding reinforced-concrete/rock mass by outer structure 36 that can be kept relatively cool, e.g. 200°-250° C. The concrete/rock mass then is never exposed to temperatures much higher than 150-200° C., even locally, which means that its strength properties cannot be much affected. Furthermore, the space between structures 35 and 36 can be pressurized to an adjustable pressure created by steam produced by the water-jet cooling of bellows 60 and plates 32. An intermediate pressure between atmospheric and half of the pressure existing in the cavity can be maintained there at all times. This means that the hoop loading of structure 35 is reduced by half as are those of structure 36 and of the concrete/rock mass.

However, the shock loading of the plates, but not directly of honeycomb-like structure 34, still remains to be assessed, which would be that of the static shell of Ref. 3. Its author makes an attempt therein to evaluate steady-state conditions in the cavity soon after a detonation. The assumption made therein is that droplets of molten salt 1 mm in diameter will vaporize fast enough to dissipate much of the kinetic energy contained in the expanding fireball plasma. Some of this will surely takes place, but the argument from the inventor is that a mixture of vapor, cooler plasma and unvaporized molten salt will still move outwardly at high velocity until it 'piles u p' against plates 32. The mixture will recoil then, back toward the cavity center. By then another pulsation may still rebounce outwardly to create a second impact against the plates, but of a much lower magnitude. The pressure felt by the front surfaces of the plates, shown as a function of time, will vary as depicted by the curve of FIG. 10. $P_M$ is the first pressure peak sensed by plates 32, P* is the average static pressure established throughout the cavity, seconds after detonation, and Pav. is the average pressure existing minutes after detonation.

After time δti, Pav. corresponds to the hoop loading of honeycomb structure 34, whereas dt is much shorter and corresponds to the time of arrival of the mixture front against the plates. 0 is detonation time. The two meaningful pressures are PM and Pav. as far as plates 32 and structure 34 are concerned. PM could be five to twenty times the value of Pav. and the impulse imparted to the plates corresponds to the integral °$P_t$.dt under the curve from dt to δt'. In the cavity construction shown in Ref. 3, the same would apply to the shell anchored to the rock. Before any displacement of the impacted material occurs, the material contained within the thickness of plates 32 or Ref. -3 shell is instantly accelerated to a velocity estimated between 50 and 150 ft/sec. The kinetic energy acquired by the moving mass must then be stored or dissipated until that mass stops. It cannot be temporarily stored in the material itself because it would require appreciable permanent stretching of the material which would of course yield the energy dissipation needed but at the cost of residual material stretching. This is unacceptable in the case of many thousands of repetitive cycles. Soon, the concrete structure in contact with the shell is bound to separate from the shell and to start disintegrating.

Thus no impacted structure should ever be in contact with the surrounding concrete/rock, but ought to be decoupled from it in a manner such that no structure is ever forced or allowed to deform into the plastic or permanent deformation range of its materials. In the case where the impulse is imparted to a mass backed up by 'springy' material or dissipated in a disposable material, it suffices to insure that the reaction of that material on any supporting structure does not impose similar dynamic loading on it. This can be achieved by transforming a short-time high-pressure impulse into a long-time low-pressure impulse that yields the same value of the integral $\sqrt{P_t} \cdot dt$ mentioned earlier. That is exactly what the shock-absorbing systems described herein will do. What the combination of plates 32, the shock absorbers and honeycomb structure 34 can do dynamically dictates what, in final analysis, the pressure/temperature conditions ought to be in the cavity less than a few seconds after detonation time. This corresponds to many times what one thin steel shell backed up by reinforced concrete and rock bed could ever provide. In summary, the containment system determines the upper limits of the possibilities of pulsed nuclear power plants and the optimum relationships between pressures and temperatures at their maximum values. From these, cavity size, device yield and plant performance can be determined and optimized for any given combination of plant output mode, i.e. power level, types of fuel breeding, etc..., and corresponding device design.

Shell Fragmentation and Bellows:

Fragmented shell 31 forming cavity 30 of FIG. 1 behaves like a solid shell, as far as the impacting mixture is concerned, for the very short time during which most of the impulse is imparted to the segment plates 32. A negligible amount of mixture will find its way through the narrow gaps between adjoining plate sides, and between plate corners 96 and tubes 102. Some will travel along the length of bores 140 to be deflected into the interspaces between bellows (FIG. 18). It can be assumed that the effects of such minor leaks will not significantly affect the system operation. For the sake of simplicity, one can assume that the combination of delivered impulse and plate mass per unit area is such that the plates acquire a radial velocity outwardly of 100 ft/sec and that an interaction time is a nominal 0.001 sec at a constant impact pressure of 1000 psi which delivers a unit impulse per square inch of one pound×second (1 lb.sec). Assuming further that plates 32 are made of a steel ally (Hastelloy-n for instance) and have a uniform thickness, one can easily calculate the latter which is then 1.17 inch. If P(t) varies linearly as a first approximation as depicted by line L of FIG. 10, the peak pressure is then 2000 psi for a same interaction duration of 1 msec. Plate 32 thickness then 0.923 in. Because of local stresses caused by the plate high peak acceleration on any mechanical attachment to structural connections therewith, the initial velocity V imparted to the plate could not realistically exceed by much the value of 100 ft/sec mentioned above as a yardstick. Therefore, V=100 ft/sec is kept constant in the following discussion. A thickness of 0.923 in. corresponds to about 23.4 mm and is roughly twelve times larger than the maximum skin thickness of 2 mm quoted in Ref. 3. Still, the peak acceleration imposed on the plates is of the order of 6,000 g's (g being the gravitational constant). It would be 72,000 g's for a steel skin 2-mm thick. Under such impact-like loading, the skin will rapidly shear off the end of anchoring rock bolts as depicted in FIG. 3 of Ref. 3. Moreover, skin backed up by concrete will plastically deform each time it is hit by a shock wave because of the mechanical impedance mismatch between steel and concrete or rock. After a number of detonations much lower than those contemplated in Ref. 3, the skin will rupture. A skin having a thickness of the plates might fare better, but only last longer to fail far shorter of the lifetime of 30 years. It seems more logical to allow the skin or shell to fracture in a controlled manner and to restrain the displacement of the fractured-shell fragments, providing that the sealing of the cavity interior is achieved behind these fragments. As shown previously, this is just what the present invention does as indicated in FIGS. 1, 2, 11 and 13 herein.

The sealing function is performed by bellows 60 or 60* which are attached both to the pre-fractured shell segments and to inner structure 35. Plates 32, bellows 60 and structure 35 cooperate to insure both the sealing and to permit a restrained displacement of the plates. Bellows 60 and structure 35 are spared the direct shock loading, though the attachment of the bellows to the plates and the transient behavior of the bellows now deserve to be discussed. First, the environmental conditions to which the bellows are exposed during the first second after the detonation must be evaluated. These are mostly determined by the leakage of molten salt liquid, vapor and plasma residual that pile up against the plates, and are enabled to pass through the gaps earlier mentioned. Cavity 30 has a diameter of 78 m (256 ft), an area of 19,200 m$^2$ (198,000 ft$^2$) and will require some 7000 plates of approximately six feet in diameter or about 135 plates along a cavity 30 circumference. In other words, one plate covers 2.68 degrees of arc. Thus, angle $\alpha$ of FIG. 2 is also about 2.68 degrees. The growth of the interplate gaps during the first second can now be calculated, assuming a simple case of plate acceleration by a linearly decreasing acceleration for 1 msec to a terminal velocity V of 100 ft/sec for a peak pressure of 2,000 psi. The plate acceleration then decreases from $2 \times 10^5$ ft/sec$^2$ to 0 during that first millisecond of the plate radial travel outwardly directed.

For an acceleration duration of 0.001 sec, the plates move $8 \times 10^{-4}$ inch, whereas they move $4 \times 10^{-2}$ inch during an acceleration time of 0.010 sec, or ten times slower This is more by a ratio of 50/1. Even when the pressure pulse duration is 0.1 sec, the plate displacements during that time are still small (2.0 inches). The peak accelerations are respectively 6,200 g's, 620 g's and 62 g's. It is believed that the duration will be between 1.0 and 10 msec, which indicates acceleration peaks between 5,000 and 1,000 g's and peak pressures between 5,000 and 1,000 psi, roughly. Interplate gaps will grow a very small fraction of an inch during such times. The open end areas of tubes 102 (FIG. 15) is not much larger than the sum total of the gap areas formed during the interact-on time. It should be remembered that the shock wave pressure applied on the plates decreases rapidly from its peak value and that molten salt is still being injected when the front of the shock wave arrives. This causes a cooler mixture to be expulsed through deflectors 104 into the bellows interspaces. Each one of the three deflectors per guiding injection tube should be directed toward the spaces located between three contiguous bellows to prevent direct jetting against bellows sides and their convolutions.

Until the plate decelerates to a velocity lower than that of compression waves travelling along its convoluted sides, the bellows convolutions close to the plate keep being squashed against the plate backface 71' and then against one another. That lower compressed portion of the bellows behaves as a solid mass that adds its mass to that of the plate, though having a negligible effect. If crushable and disposable shock absorbers are used, the end in contact with plate backface 71' during the early part of the plate acceleration is smashed. The thin wall of individual corrugations such as 76, 77 and 78 of FIG. 4 do not have time to evenly buckle in their regular collapsing mode as described in Ref. 4. Again, after a while when plates 32 have slowed down somewhat, the walls buckle regularly and crushing begins. At the onset of the smashing period, the resistance to crushing is characterized by a sharp increase of the honeycomb structure resistance as shown in FIG. -8 graph (Fp). The onset of the crushing period at slow rates is characterized by a much lower peak Fb. Fc is the steady force required to keep the crushing process proceed at low speed. Fp corresponds to dynamic buckling (high speed) and Fb corresponds to static buckling (low speed). Crushing corresponds to static buckling propagating forward at a slow speed. Fc can be eliminated by precrushing a shock-absorbing honeycomb structure on a press bench so as to pre-form the first pre-crushed regular convolution that is shaped as an hexagon in the case of a thin wall tube for instance. The second convolution forms naturally as another hexagon positioned at a 30-degree angular offset with regard to the first convolution. Such convolutions are not to be confused with bellows convolutions. Bellows deformations in the metal elastic range can be applied many times whereas crushed honeycomb structures cannot be reused, thus they must be disposable. The energy absorbed in the metal-crushing process is dissipated by unevenly stretching the metal permanently way beyond its elastic deformation range.

Another environmental condition to which plates 32 and bellows 60 or 60* are exposed is temperature. In Ref. 3, the author mentions that the injection of 2 tons of cold molten salt in cavity 30 before detonation will result in temperatures around 1200° C. if a 2-kT (kiloton) yield device is used. Such high temperatures cannot be tolerated for long. Mention is also made there that the injection of another 5 tons of cold molten salt would bring the temperature down to 700° C. Both the plates and the bellows can withstand such temperatures indefinitely, especially if the sPace inside the bellows is cooled.

So as to minimize the shock wave magnitude, it appears desirable to inject the 7 tons of molten salt just before the detonation and have these 7 tons in the form of small droplets evenly distributed between the device and the plates. This means that the injection duration must be kept as short as possible so as to avoid gathering of much liquid at the bottom of cavity 30. The method of injection preferred in the present invention is that which spread droplets along conical patterns of large cone angle so as to cause the formation of small droplets near the plates but generally directed toward the cavity center at a relatively low velocity. The average local concentration of droplets uniformally distributed throughout the cavity volume is only 1 to 2% by volume. The tendency of a cloud of such droplets is to fall down. In order to minimize the effect of such free fall, the start of the liquid injection may be delayed for injection tubes located higher up, so that a time-space programmed introduction of the molten salt in the cavity takes place. However, the amount of liquid injected is roughly the same at all radial locations around the device at detonation time. Thus, by the time the shock wave reaches plates 32, both the impulses delivered and the average temperatures existing in the mixture piled up against every plates will not vary appreciably from plate to plate.

The local environment in which the most critical part of the shock-absorbing system, i.e. the attachment of the bellows to the plates, must operate can be somewhat controlled. Nevertheless, this part of the system will always remain critical. It may be defined as the plate/bellows contact area and the first membrane of the first convolution of the bellows (FIGS. 3 and 13-14) connected to the plate backface 71'. That first membrane can be brazed or seam welded to the plate. Minimum tension must be maintained on that joint which can easily be done, as shown in FIG. 3, in which case successive bellows membranes are pre-formed to come to a nestling position when packed tight by a rapid outward motion of the plate. Seam welds at the edges of each membrane between adjacent membranes will ensure complete pliability without the creation of excessive stresses. Each membrane consists of a plurality of foils or plies (FIG. 6) as described in the previous section.

The bellows shown in FIGS. 13 and 14 provide a construction in which the inter-membrane junctions are eliminated. Solid metal rings 60' and 60" prevent excessive stresses from building at the site of any curvature between adjacent membranes. However, as depicted in FIG. 14, the first few membranes close to the plate are left unsupported between rings 21' and w2' for instance) when two adjacent rings (r1 and r2) are urged to come into contact (r1 and r2' for instance). The membranes also consist of a plurality of foils or plies so as to limit their rigidity, but which, unfortunately, also limits their ability to remain flat or slightly conical. it is not known whether these two contrary requirements can be made to remain compatible to the extent that unacceptable stresses will not be generated in the membrane between rings.

Also an externally-applied pressure differential exists across bellows 60 and 60* walls. The pressure existing inside honeycomblike structure 34, i.e. between structures 35 and 36, can be controlled to remain below cavity pressures within set limits with the use of steam generated by the cooling by water of plates 32, bellows 60 and structure 35. It is obvious that the collapse of some convolutions at the expense of elongations of other convolutions cannot be tolerated. Such stability condition of the walls of the bellows must also be carefully considered in the design of the bellows and the determination of the upper limit of the pressure differential mentioned above. It should be emphasized here that bellows 60 are always urged into compression, never to expansion, by their mode of operation. They are required neither to support nor to guide plates 32 at any time.

Shock Absorber Embodiments:

A shock-absorbing system, of whatever type, can be installed between the segment plates and whichever structure that can support individual shock absorbers and resist their reactions. Three basic embodiments are described in the previous section. Neither one is preferred over the other two, but each one embodies a different basic approach to absorbing the kinetic energy of its associated plate. This energy can either be stored and mostly restored back later or be immediately dissipated as it is absorbed. The system described in Ref. 1 and partly illustrated in FIG. 21 herein is an energy-storing type, though most of the stored energy is later mostly dissipated or used elsewhere. The system illustrated in FIG. 19 herein is an energy-storing type, though the manner by which the incompressible fluid is either throttled in valving system 150 or caused to be stored in pressurized holding tanks (not shown here) could make it belong mostly to one type or the other. The only truly and fully dissipative system is that in which crushable and disposable shock absorber units are used (FIGS. 4, 7, 11 and 12). The energy dissipated in the crushing process cannot possibly be recovered and must be disposed of by removal of the crushed units. The steps of unit removal and replacement thereof complicate the basic system which otherwise is very simple. However, such operational steps can be rendered automatic with the use of known conveying and handling systems and chamberlocks, neither of which are shown here for the sake of simplicity and being also well known in the art. Passages such as holes 101 and ample separation distances between structures 35 and 36 make space provisions for the installations of such servicing accessory systems.

For any type of shock absorbers, the individual roles and functions of the components of each type must now be discussed. First, a common trait to all is their ability to handle the kinetic energy of the plates $MV^2/2$, where M is a plate-32 mass. For plate dimensions earlier mentioned, this kinetic energy is about $4.6 \times 10^6$ ft.lbs per plate. If this amount of energy requires 4 to 5 ft of plate travel to be dissipated or stored, the amount of net resistance to that travel must be an average of $10^6$ lbs. Applied onto a plate effective area of 4100 in$^2$, the average effective pressure exerted on the plate amounts to roughly 240 psi. This corresponds to an average pressure reaction from each shock absorber of 500-1000 psi depending on the effective cross-sectional area of a shock absorber assembly. For an initial velocity V of 100 ft/sec of the plate, this corresponds to an arresting time of 0.1 sec.

Such an arresting time may seem very short, but it is 10-100 times longer than an estimated plate acceleration duration of 10-1 msec earlier assumed. However, the arresting distance or plate travel is many times longer than the distance covered by a plate during its acceleration period by a ratio of 10 to 100. The loads transmitted to the shock absorber support are of the order of magnitude of those that the steady-state static pressure existing in cavity 30 a few seconds after detonation will generate in structure assembly 34 or the skin/supporting-concrete described in Ref. 3 by its author. At the limit of simplification of a shock-absorbing system, water could be used to fill the interspace volume between inner structure 34, plates 32, bellows 60 (or 60*) and outer structure 36. The volume of water displaced by plates 32 during their radial and outwardly-directed strokes multiplied by the water pressure increase would represent the total kinetic energy of all the plates and momentarily stored in them. Though quite outlandish, such a concept would in fact greatly simplify the cooling of plates 32, the bellows and structure 35.

Referring to FIG. -11 illustration, only plates 32, inner structure 35, outer structure 36, webs 100, injection guiding tubes 102 and modified cover plates 112 will remain. Holding, locking and returning plates 32 to detonation positions can be performed by means of water flowing in and out of the volume just defined. The boiling of water off the metallic surfaces with which water will be in contact can be handled by pressurizing the water volume to the pressure existing in cavity 30. The heat transfer rate through the metal thicknesses separating molten salt from cooling water will be the highest in the bellows walls. A valving system similar to that shown schematically in FIG. 20 and mounted in hole 114 of a modified cover plate 112 could be used to pressurize the interior volume of each bellows assembly. Two pressure levels of the water and two corresponding separate water cooling systems will facilitate the control of pressure differentials across the bellows membranes and of the temperature of inner structure 35.

The temperatures of the surface of metallic walls in contact with the molten salt will range from 400° C. to 700-800° C. The temperatures of the surface of these walls in contact with the water should probably not exceed 200°-250° C. The thickness of the bellows membranes will probably be less than one tenth of that of both the plates and inner structure 35. This explains why the heat transfer rates through each one of two types of such walls are quoted above as being very different. One major problem though remains unresolved, i.e. how fast can the pressure outside the bellows be made to increase to match the quasi-instantaneous rise of pressure inside the bellows caused by the fast outward motion of the plates within a fraction of a second after detonation?. Fortunately, the pressure around the bellows can be caused to rise faster by increasing the leakage flow between the plates, as indicated by notches n cut on the edges of plates 32 (FIG. 9), in this instance. It is quite possible that the rate of increase of the resulting outside pressure can be made to follow the inside pressure within a pressure differential that the bellows structure can withstand. Furthermore, the volume inside bellows 60 (or 60*) can be made variable by mounting a smaller-diameter bellows 200 on the inner face of a modified cover plate 201 as shown in dotted lines. Compensating bellows 200 will be equipped with an end plate 202 onto which the pressurizing valving system 204 will be installed. Distance d* will be larger than the maximum stroke of bellows 60 (or 60*). It is believed that combinations of the number and sizes of notches n, of bellows 200 diameter and of pressure settings of the pressurizing valving system 204 will enable control of the pressure differential across bellows 60 (or 60*) walls within an acceptable range compatible with the bellows strength. Boss 126 and receptacle 125 for locking ball 124 are no longer needed (see FIG. 11).

It is of interest to check whether a water cushion located behind the cavity skin of Ref. -3 design could play a similar role. The compressibility of water is about one order of magnitude higher than that of steel. Therefore, it appears doubtful that such a water cushion could prevent the skin from stretching well beyond the elastic limit of its material, after the first detonation. The same rationale used previously applies as well again in this simplified embodiment construction case.

Crushable and Disposable Shock Absorber:

For the reasons given previously, the end of a crushable shock absorber unit is press-bench pre-crushed so that this end comes in contact with plate 32 backface 71'. The amount of pre-crushing needed corresponds to the formation of one hexagonal convolution, meaning that walls 76, 77 and 78 of FIG. 4, for example, collapse in a local buckling mode. Three opposite walls collapse inwardly and the three opposite walls collapse outwardly, with two adjoining walls collapsing in inverse direction. Plates 32 may be either flat or spherically curved. If backfaces 71' are curved, the pre-crushing can be performed so that the pre-crushed end matches the shape of the plate.

The other end of the shock absorber unit can be coated with a plastic adhesive that adheres to cover plate 112 for handling purposes and that cures to become brittle when exposed to the hot environment surrounding it, when in place. For both new unit installation and used unit removal, the units must enter and leave the space between structures 35 and 36. To that end, lock chambers are provided in several locations equidistantly positioned and mounted on structure 36. Each lock chamber is used to service U/X shock absorber sites, if U is the total number of shock absorbers and X is the number of lock chambers. Unit-conveying systems originate at the site of each chamber lock and diverge from there to reach all shock absorber sites serviced by that lock chamber. Such systems are state-of-the-art and need no further elaboration. Unit ends in contact with the cover plates are neither crushed nor damaged. Thus the units can be handled by means of pinching claws that seize the top part of some walls of units, new and/or used Liquid-filled Shock Absorbers:

Though the liquid could be water, these shock absorbers shown in FIGS. 2, 9, 19 and 20, consist of individual small-diameter bellows filled with a pressurized liquid that can escape under pressure by means of automatic valving systems 150. The pressure generated by the outward displacement of their ends 65 pushed by plates 32, as earlier mentioned, creates the reactions that stop the plates. If the liquid is water, it may be part of the water cooling system described earlier, but it is pressurized by pumps and stored in separate pressure tanks located in spaces above cover plates 112' (FIG. 20) between structures 35 and 36. Neither the ducting nor the pumps and tanks are shown, being state-of-the-art in both cases. If the liquid is other than water, an identical system is used, but remains independent of the cooling-water system.

Cylinder/Piston Shock Absorbers:

As earlier mentioned such system is extensively described and discussed in Ref. 1. This is not repeated here. The part of that system which is different is shown in FIG. 21. In Ref. -1 system, the working fluid is saturated and superheated steam. The shock absorbers use steam as the compressible fluid in their operation. Therefore, steam leakage from the shock absorber confines into the detonation cavity is permissible and convenient. Such is not the case in the present invention power plant model, as emphasized earlier herein. The flexible attachment of rigid component 165 (FIG. 21) of the cylinder/piston assembly was achieved by means of a toroidally shaped stage having metallic flexible walls. That configuration adopted herein is quite different and attempts to isolate the compressible fluid therein from the working fluid, in the manner done with bellows 60. Bellows 63' can be either separate individual bellows having each a small circular end plate 167 or form an annular assembly having one single annular end plate 168. In the first instance, the peak pressures inside the bellows are considerably higher than those reached in the second instance. End plates 167 or 168 rest against plates 32 and are not attached to them. The purpose of bellows 63' is to absorb part of the kinetic energy of plates 32 and to transfer it to rigid component 165 so that it can be accelerated to the same velocity that plate 32 has at that instant. To prevent continuing oscillations of component 165 after the separation distance between plate 32 and base plate 164 reaches its minimum, self-locking device 67' joins the two rigid components so as to cause plate 32 and component 165 to continue their travel jointly, acting as one single mass.

Component 165 will preferably be the rigid wall of the piston stem that is connected to the piston located in its associated cylinder, so that the space above bellows 60 (or 60*) can be used. Braking and locking of component 165 wall at the end of its outwardly directed excursion is performed by means of self-locking brake shoes applied onto both surfaces of component 165 wall in the manner described and discussed in Ref. 1. The controlled returns of plates 32 are also elaborated on in that reference.

Operation and Integration of Shock Absorbers in the Power Plant:

The sequencing and timing of the shock-absorbing system operational steps must be coordinated with those of the other systems required to operate a pulsed nuclear power plant of the type adopted as model. The nature and functions of the various systems needed to operate the plant repeatedly are indicated in diagrammatical form in FIG. 22. The block diagram therein shows both the components and/or their functions, and/or operations, as deemed most explicit in the context of the present disclosure. The duration between consecutive detonations, or cycle, could vary from a few to several hours depending on the power level desired of the plant. Therefore ample time is available for the performance of all steps and/or operations described and discussed earlier herein. With the help of Ref. 1, 2 and 3, all readily available, the reader will be enabled to easily understand the block diagram of FIG. 22.

Because the kinetic energy of plates 32 can easily be calculated, and the composition of the contents of cavity 30 and the nuclear device design are known, the device yield can readily be established, knowing also the environmental conditions before and a few seconds after detonation. Arrows 206 and 208 indicate symbolically that a fraction of the fuel 'bred' or produced during shot "n−1" at time "t" can be used in the composition of the nuclear fuel that will energize the device used in shot "n" at time "t+τ". 'Symbolically', because 'an amount equivalent to' is only meant by symbolically, since processing of the bred fuel will probably take much longer than the duration τ of one cycle. The reader will understand that the source of the nuclear material used in each device is immaterial. Also, the manner by which power is extracted from the steam is not relevant here. The reader is advised to refer to Ref. 1, for instance, should more information be wanted.

The schematic graphs of FIG. 23 pertain to the timing and sequencing of the various operational steps performed by some of the components and systems shown in FIG. -22 block diagram. For each graph, the presence of one solid line and of one dotted line signifies that both a variable timing and a variable duration of the function indicated are possible. Only two positions are shown for each function: ON and OFF; as depicted in the case of Plate Locking Though not repeated for each function, the reader will understand that the same thing applies for all other functions illustrated. When a slope is given to a portion of each graph, it only means that a velocity or rate of progression exists between the ON and the OFF positions. A case in point is the motion of the plates indicated as Plate Return. Because device detonations are instantaneous and denote both the beginning and the end of a time cycle τ, they are shown as single arrows pointing up.

When FIGS. 22 and 23 are viewed together by a reader familiar with the art, the information conveyed will immediately and readily show how the operation of the shock absorbers (S.A.) can be integrated in that of the basic power plant described in Ref. 2 and 3. The reader will also understand that the external shock-absorbing system of the present invention can just as easily be integrated in the basic power plant described in Ref. 1, though being of much less necessity therein.

Conclusive Remarks:

The concept and embodiment constructions discussed herein of external shock-absorbing systems enable the total isolation of cavities in which nuclear devices are detonated. Such isolation pertains to the environment inside the cavities as well as to the mechanical effects that such detonations would otherwise generate externally to the cavities. As pointed out in Ref. 1 and as emphasized herein, no shock is transmitted outside the cavity because the compressive loads transferred to the surrounding rock formation are much less brusque than an explosion or the releases of potential energy, such as those causing earthquakes. The radioactive materials produced by the nuclear detonations are contained in and confined by a sealed volume, albeit rendered variable for accommodating its expansion that cannot possibly be avoided.

In the process of enabling the cavity volume to vary so as to practically nullify external shock effects, the shock-absorbing system of the present invention also allows the dissociation of shock transmission from that of heat to the surrounding concrete and/or rock bed. The probability that such shock protection will guarantee survival of the cavity after hundred of thousands shots or for a lifetime of thirty years is very good indeed. That does not appear to be the case of cavity constructions in which the cavity volume, i.e. the area of the surface defining it, is practically fixed and constrained. For those reasons, external shock-absorbing systems such as those embodied in the present invention or variations thereof, seem to be indispensable to assure the practicability of pulsed nuclear power plants. The more so for those in which the working fluid is of a very complex and difficult nature, e.g. that of the working fluid used in the concept described in Ref. 2 and Ref. 3. The inevitable accumulation of and increase in tritium concentration in the steam/water used as working fluid in the case of Ref. -1 concept would mandate the adoption of sealing features such as those provided by bellows systems and of the segregation of the working fluid from the shock absorber compressible fluid.

Therefore, it is believed that the shock-absorbing system of this invention and the operational method of use thereof and many of its attendant advantages will be understood from the foregoing description and discussion, and that it will be apparent that various changes may be made in the form, construction and arrangement of the parts thereof without departing from the spirit and scope of the present invention or sacrificing any and all of its material advantages, the form described hereinbefore being merely a preferred or examplary embodiment thereof.

Having thus described my invention, I now claim:

1. In a nuclear power plant, a shock absorbing-system for decoupling shocks generated by sequenced detonations of nuclear devices in the central portion of a cavity formed by an outer structure of the power plant from said outer structure, the power plant including an inner structure affixed to the outer structure and a purality of plate segments adjacent to one another for defining a fragmented wall for a substantially spherical shell located inside the inner structure, said shell, inner and outer structures being generally concentric, a working fluid to which most of the energy generated by each detonation is transferred for subsequent use, said cavity being substantially spherical in shape and sealed off from a space formed between the inner and outer structures, said shock-absorbing system connecting the plate segments to the inner structure and comprising:

energy dissipating means for disposing of the kinetic energy resulting from the velocity imparted to the plate segments by the shock wave created by the device detonation in the working fluid;

a plurality of flexible bellows connecting the plate segments to the inner structure for sealing off the internal space defined by said bellows, the plate segments and the inner structure; and a plurality of reactive means located inside the bellows and in contact with the plate segments at one end while being supported by the inner structure at another end for arresting said segment plates in their outwardly directed travel, thereby transmitting hoop loads of smaller magnitude but longer duration to the inner structure than those which the detonation shock would have otherwise produced.

2. The shock-absorbing system according to claim 1 wherein the outer structure is located underground and anchored to a surrounding rock formation.

3. The shock-absorbing system according to claim 1 wherein the reactive means includes water filling a space defined by the plate segments, the inner structure and the bellows internal surfaces.

4. The shock-absorbing system according to claim 1 wherein each reactive means comprises a shock absorber element made of crushable material for absorbing energy while being crushed.

5. The shock-absorbing system according to claim 4 wherein a plurality of openings is provided in the inner structure and in structural reinforcements connecting the inner and outer structures so as to enable the removal of crushed elements and their replacement by uncrushed elements.

6. The shock-absorbing system according to claim 1 wherein the reactive means includes a piston and cylinder arrangement wherein each piston is flexible connected to an associated plate segment and each cylinder is attached to the outer structure, said arrangement including compressible fluid means and further comprising:

braking means for dissipating the plate segment kinetic energy and holding the piston at a position of maximum travel; and brake releasing means for slowly returning the plate segment to its original position for the next detonation;

whereby only reactions of the cylinder on the outer structure are transmitted.

7. The shock-absorbing system according to claim 1 wherein means is provided for leaving openings at locations where adjacent plate segment sides meet when forming the shell so as to enable working fluid to flow across said shell fragmented wall in a programmed way.

8. The shock-absorbing system according to claim 1 wherein tube means is provided for introducing liquid working fluid inside the cavity and for guiding the plate segments during their outwardly directed travels after a detonation.

9. The shock-absorbing system according to claim 1 wherein means is provided for synchronously returning the plate segments to the positions at which they form the cavity shell.

10. The shock-absorbing system according to claim 1 wherein means is provided for maintaining a pressure in the space located between the inner structure and the outer structure at a level lower than that existing in the cavity but higher than that of the pressure existing externally to the outer structure, whereby both the outer structure and the inner structure are subjected to differential pressure loads smaller than those existing inside the cavity shell.

11. The shock-absorbing system according to claim 10 wherein a plurality of structural webs, located in the space separating the outer structure from the inner structure and equidistantly positioned around and between openings provided in the inner structure for the passage of shock absorber elements therethrough, provide structural reinforcements to both inner and outer structures.

12. The shock-absorbing system according to claim 11 wherein the reinforcing web structure provides:
    means for thermally isolating the outer structure from the inner structure, thereby enabling the outer structure to remain cooler than the inner structure;
    means for transferring some of the hoop stress loading created in the inner structure to the cooler outer structure; and
    access means for cooling the internal surfaces of the bellows, the external surface of the inner structure and the portion of the plate segment outer surface open to the bellows inside volume.

13. The shock-absorbing system according to claim 1 wherein the reactive means includes a plurality of bellows with an outer diameter smaller than the inner diameter of the bellows connecting the plate segment to the inner structure and filled with an incompressible liquid, said liquid-filled bellows further comprising:
    an end plate structure for making contact with the plate segment during its outwardly-directed stroke; and
    a pressurizing valving device for throttling the flow of liquid so as to create a reaction against the plate segment travel and for admitting liquid back in the liquid-filled bellows so as to return each plate segment to its shell-forming position.

14. The shock-absorbing system according to claim 5 wherein actuated stop means are provided for holding each plate segment at its maximum travel position so as to resist the working fluid pressure exerted on a major portion of the plate segment inner surface, and further comprising:
    actuating means for locking and unlocking a cover plate onto which the crushable shock-absorbing element is mounted; and
    seizing and lifting means for extracting the cover plate and the crushed element so as to place said element in position for removal and replacement by an uncrushed element.

15. The shock-absorbing system according to claim 1 wherein the operation of said system is synchronized and integrated with operations of other systems attendant to the functioning of the pulsed nuclear power plant, and further comprising:
    control means for monitoring the return of the plate segments to their shell-forming position before the next detonation of another nuclear device;
    segment-displacement sensing means for determining the plate segment outward velocity so as to establish the impulse delivered to the segment plate and ultimately the device yield; and
    monitoring means for coordinating the timing of the operation of all systems as a function of time elapsed after each detonation.

16. The shock-absorbing system according to claim 1 wherein means is provided for locking and unlocking the plate segments onto and from the outer structure at the position of maximum travel of the plate segments from their shell-forming positions.

* * * * *